US012627343B2

(12) United States Patent
Jung et al.

(10) Patent No.: US 12,627,343 B2
(45) Date of Patent: May 12, 2026

(54) OPERATION METHOD OF USER EQUIPMENT FOR BEAMFORMING IN WIRELESS COMMUNICATION SYSTEM AND USER EQUIPMENT THEREFOR

(71) Applicant: SAMSUNG ELECTRONICS CO., LTD., Suwon-si (KR)

(72) Inventors: Youngseok Jung, Suwon-si (KR); Joohan Kim, Suwon-si (KR); Suhwang Jeong, Suwon-si (KR); Jaehoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 18/921,755

(22) Filed: Oct. 21, 2024

(65) Prior Publication Data

US 2025/0219690 A1 Jul. 3, 2025

(30) Foreign Application Priority Data

Jan. 2, 2024 (KR) ......................... 10-2024-0000491

(51) Int. Cl.
*H04B 7/02* (2018.01)
*H04B 7/0456* (2017.01)
*H04B 7/06* (2006.01)

(52) U.S. Cl.
CPC ......... *H04B 7/0617* (2013.01); *H04B 7/0456* (2013.01)

(58) Field of Classification Search
CPC .. H04B 7/0404; H04B 7/0456; H04B 7/0617; H04B 7/0695
USPC ................ 375/262, 260, 259, 219, 295, 316
See application file for complete search history.

(56) References Cited

U.S. PATENT DOCUMENTS

| | | | |
|---|---|---|---|
| 9,814,037 B2 | 11/2017 | Xue et al. | |
| 10,897,298 B2 | 1/2021 | Kang et al. | |
| 11,343,784 B2 | 5/2022 | Wei et al. | |
| 2019/0363777 A1 * | 11/2019 | Karjalainen | .......... H04L 5/0007 |
| 2021/0105061 A1 | 4/2021 | Godala et al. | |
| 2021/0297886 A1 | 9/2021 | Chen et al. | |
| 2022/0007207 A1 | 1/2022 | Raghavan et al. | |
| 2022/0053385 A1 | 2/2022 | Li et al. | |
| 2022/0069893 A1 | 3/2022 | Abedini et al. | |
| 2022/0349981 A1 | 11/2022 | Akkarakaran et al. | |
| 2023/0254837 A1 | 8/2023 | Raghavan et al. | |
| 2023/0305099 A1 | 9/2023 | Thomas et al. | |

FOREIGN PATENT DOCUMENTS

JP 2023-111290 8/2023

OTHER PUBLICATIONS

Extended European Search Report in European Appln. No. 24214749.4, mailed on May 7, 2025, 10 pages.

* cited by examiner

*Primary Examiner* — Zewdu A Kassa
(74) *Attorney, Agent, or Firm* — Fish & Richardson P.C.

(57) ABSTRACT

Provided are an operation method of a user equipment and a user equipment for the operation method. The operation method includes obtaining channel estimation information comprising beam direction information of a base station. The operation method includes performing channel estimation for beamforming based on the channel estimation information. The operation method includes forming a beam based on the channel estimation. The beam direction information of the base station is generated using a geographic coordinate system.

20 Claims, 10 Drawing Sheets

10

50

START

SELECT BEST SSB — S510

OBTAIN BEAM DIRECTION INFORMATION
MATCHED TO BEST SSB — S520

OBTAIN 3-DIMENSIONAL ORIENTATION INFORMATION
OF USER EQUIPMENT — S530

CALCULATE TRANSMISSION/RECEPTION ANGLE
OF USER EQUIPMENT BASED ON
BEAM DIRECTION INFORMATION AND
3-DIMENSIONAL ORIENTATION INFORMATION — S540

FORM BEAM BASED ON
TRANSMISSION/RECEPTION ANGLE — S550

END

OPERATION METHOD OF USER EQUIPMENT FOR BEAMFORMING IN WIRELESS COMMUNICATION SYSTEM AND USER EQUIPMENT THEREFOR

CROSS-REFERENCE TO RELATED APPLICATION

This application claims priority under 35 U.S.C. § 119 to Korean Patent Application No. 10-2024-0000491, filed on Jan. 2, 2024, in the Korean Intellectual Property Office, the disclosure of which is incorporated by reference herein in its entirety.

BACKGROUND

Recently, 5G (or New Radio (NR)) communication systems aim at providing ultrahigh-speed data services at several gigabits per second (Gbps) by using, as a new radio access technology, Ultra-Wideband having a bandwidth of 100 MHz or more as compared with existing Long-Term Evolution (LTE) and LTE-Advanced (LTE-A). However, because it is difficult to secure frequencies in an ultrawide band of 100 MHz or more in a frequency band of hundreds of MHz or several GHz, which is used in LTE and LTE-A, methods of transmitting signals by using a wide frequency band in a frequency band of 6 GHz or more are considered for 5G communication systems. Specifically, in 5G communication systems, transmission rates may be increased by using a millimeter-wave band, such as a 28 GHz band or a 60 GHz band.

Beamforming is a type of smart antenna and refers to a technique of concentrating a beam of an antenna on a specific terminal (for example, a receiving device), and a smart antenna may be implemented by using a large number of antennas to improve efficiency. Implementing a large number of antennas in both a transmitter and a receiver may be referred to as multiple-input and multiple output (MIMO).

Because the complexity of reception is increased due to a large number of antennas, there may be an issue of a deterioration in the performance of channel estimation for beamforming in a high-frequency band, such as a millimeter-wave band.

SUMMARY

The disclosure provides an operation method of a user equipment and a user equipment performing the operation method. The operation method allows a range for channel estimation to be reduced by performing channel estimation for beamforming, based on channel estimation information including beam direction information of a base station, and allows a beam to be relatively quickly formed by performing channel estimation on the reduced range.

According to an aspect of the disclosure, there is provided an operation method of a user equipment including a plurality of element antennas, the operation method including obtaining channel estimation information including beam direction information of a base station, performing channel estimation for beamforming based on the channel estimation information, and forming a beam based on the channel estimation, wherein the beam direction information of the base station is formed based on a geographic coordinate system.

According to another aspect of the disclosure, there is provided an operation method of a user equipment in a wireless communication system, the operation method including selecting a best synchronization signal block (SSB) from among a plurality of SSBs received from a base station, obtaining beam direction information matched to the best SSB, obtaining 3-dimensional orientation information of the user equipment, calculating a transmission/reception angle of the user equipment based on the beam direction information and on the 3-dimensional orientation information of the user equipment, and forming a beam based on the transmission/reception angle of the user equipment.

According to another aspect of the disclosure, there is provided a user equipment for wireless communication, the user equipment including a plurality of element antennas and a communication processor configured to perform channel estimation for beamforming based on channel estimation information including beam direction information of a base station and form a beam based on the channel estimation, wherein the beam direction information is formed based on a geographic coordinate system.

BRIEF DESCRIPTION OF THE DRAWINGS

Embodiments will be more clearly understood from the following detailed description taken in conjunction with the accompanying drawings in which:

FIG. 9 is a block diagram illustrating an electronic device according to one or more embodiments; and FIG. 10 is a conceptual diagram illustrating an Internet-of-Things (IoT) network system to which one or more embodiments is applied.

DETAILED DESCRIPTION

Hereinafter, embodiments of the disclosure will be described in detail with reference to the accompanying drawings.

Figure 1:
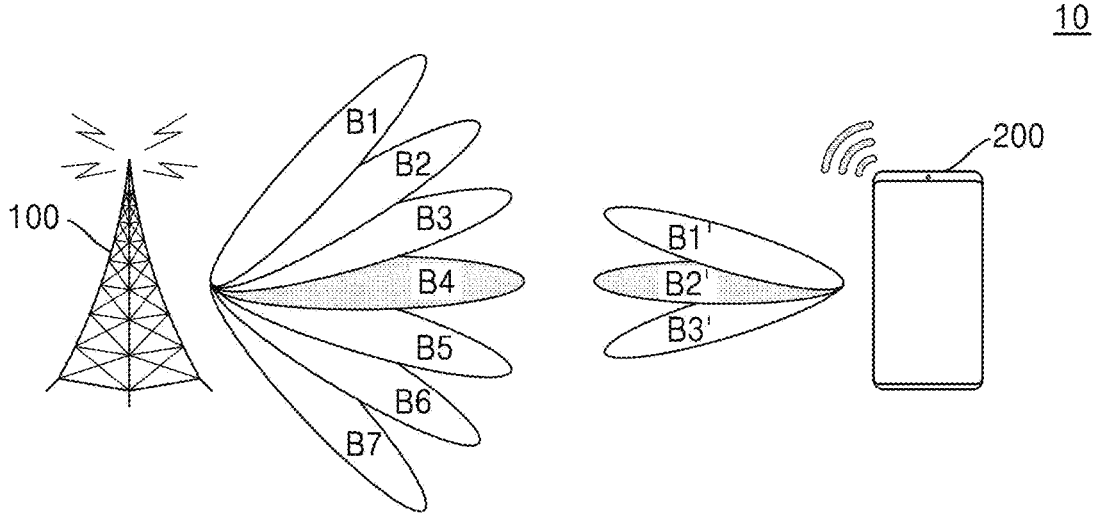
FIG. 1 is a block diagram illustrating a wireless communication system according to one or more embodiments.

FIG. 1 is a block diagram illustrating a wireless communication system according to one or more embodiments.

As shown in FIG. 1, a wireless communication system 10 includes a base station 100 and a user equipment 200.

Although the wireless communication system 10 is shown as including only one base station 100 and one user equipment 200 for convenience of description, this is only an example, and the wireless communication system 10 is not limited thereto and may be implemented to include more base stations or user equipments.

The user equipment 200 may access the wireless communication system 10 by transmitting signals to and receiving signals from the base station 100. The wireless communication system 10, which may be accessed by the user equipment 200, may also be referred to as a radio access technology (RAT) system. Although the wireless communication system 10 accessed by the user equipment 200 is described hereinafter based on a new radio (NR) network, such as an NR network provided in the Third Generation Partnership Project (3GPP) releases, the disclosure is not limited to the NR network and may also be applied to other wireless communication systems (for example, cellular communication systems, such as long-term evolution (LTE) systems, LTE-advanced (LTE-A) systems, wireless broadband (WiBro) systems, global system for mobile communication (GSM) systems, or next-generation (for example, 6G) communication systems, Non-Terrestrial Network (NTN) communication systems, or short-range communication systems, such as Bluetooth systems or near-field communication (NFC) systems) having similar technical backgrounds or channel settings).

A wireless communication network of the wireless communication system 10 may support a large number of wireless communication devices including the user equipment 200 to communicate with each other by sharing available network resources. For example, in the wireless communication network, information may be transferred by various multiple-access methods, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

The base station 100 may generally include a fixed station communicating with the user equipment 200 and/or other base stations and may exchange control information and data with the user equipment 200 and/or the other base stations. For example, the base station 100 maybe referred to as a Node B, an evolved-Node B (eNB), a next-generation Node B (gNB), a sector, a site, a base transceiver system (BTS), an access point (AP), a relay node, a remote radio head (RRH), a radio unit (RU), a small cell, a wireless device, or the like. In the specification, a base station or a cell may be interpreted as indicating some areas or functions covered by a base station controller (BSC) in CDMA, a Node-B in WCDMA, eNB in LTE, a sector (site), or the like and may encompass all various coverage areas, such as mega-cell, macrocell, microcell, picocell, femtocell, relay node, RRH, RU, and small cell communication ranges.

The user equipment 200 may be stationary or mobile and may include any equipment capable of transmitting and receiving data and/or control information by communicating with the base station 100. For example, the user equipment 200 may be referred to as a terminal, a terminal equipment, a mobile station (MS), a mobile terminal (MT), a user terminal (UT), a subscribe station (SS), a wireless device, a handheld device, or the like.

Referring to FIG. 1, the user equipment 200 may communicate with the base station 100 by using beamforming. Beamforming may refer to a technique of concentrating wireless signals in a specific direction by changing amplitudes and phases of signals supplied to a large number of antennas in both the user equipment 200 and the base station 100.

In some embodiments, the user equipment 200 may perform channel estimation for beamforming to use beamforming and may form a beam based on the channel estimation. The channel estimation may refer to estimating a phase difference between element antennas of the user equipment 200 or the base station 100.

For example, the user equipment 200 or the base station 100 may include a plurality of element antennas. A phase difference between the plurality of element antennas may be estimated based on Equation 1 shown below.

$$\Delta\rho = 2\pi\frac{\Delta r}{\lambda} \qquad \text{[Equation 1]}$$

$\Delta\rho$ may represent a phase difference between the plurality of element antennas, $\Delta r$ may represent a path difference between the plurality of element antennas, and $\lambda$ may represent a wavelength for a frequency of a pilot signal or a reference signal. The pilot signal may refer to a signal or a signal channel of an output not having actual data but transmitted to help channel estimation. $\lambda$ may be approximated as a wavelength for a carrier frequency when a bandwidth is not greater than that of the carrier frequency. The carrier frequency may refer to a center frequency used in transferring information. $\Delta r$ may be differently calculated depending on the assumption of a far field or a near field, and embodiments of calculating the path difference between the plurality of element antennas are described below with reference to FIGS. 3 and 4.

In some embodiments, when performing channel estimation based on Equation 1, the user equipment 200 may perform channel estimation by using various algorithms. For example, the user equipment 200 may perform channel estimation by using a compressive sensing technique, which is a signal processing technique for efficiently obtaining and reconstructing signals, exhaustive search in which all possible cases are searched for, or machine learning in which a computer performs necessary tasks by performing continuous training even without a process or specific programming and performing prediction based on data.

The user equipment 200 may perform channel estimation for beamforming based on channel estimation information. In some embodiments, the channel estimation information may include beam direction information of the base station 100. The beam direction information of the base station 100 may be formed based on any coordinate system that may be equally interpreted by both the base station 100 and the user equipment 200.

For example, the beam direction information of the base station 100 may be formed based on a geographic coordinate system. The geographic coordinate system may refer to a coordinate system (for example, a longitude, a latitude, and an elevation) represented by coordinates, which indicate the horizontal position on the surface of a rotating ellipsoid, and an elevation above sea level, which indicates the vertical position above the surface of the rotating ellipsoid, when earth is considered as the rotating ellipsoid. Although the following description is made based on the geographic coordinate system, the disclosure is not limited to the geographic coordinate system and may also be applied to similar technical backgrounds.

In some embodiments, the beam direction information of the base station 100 may refer to a specific region. A specific region may refer to a region including at least one of a specific longitude range, a specific latitude range, or a specific elevation range based on the geographic coordinate system. For example, the base station 100 may form a plurality of beams (that is, B1 to B7). A first beam B1 may be a beam passing through or reaching a first region, a second beam B2 may be a beam passing through or reaching a second region, a third beam B3 may be a beam passing through or reaching a third region, a fourth beam B4 may be a beam passing through or reaching a fourth region, a fifth beam B5 may be a beam passing through or reaching a fifth region, a sixth beam B6 may be a beam passing through or reaching a sixth region, and a seventh beam B7 may be a beam passing through or reaching a seventh region. Each of the first to seventh regions may include at least one of a specific longitude range, a specific latitude range, or a specific elevation range based on the geographic coordinate system.

In some embodiments, the user equipment 200 may perform channel estimation for beamforming based on the obtained beam direction information of the base station 100 and may form a beam based on the channel estimation. For example, when the beam direction information of the base station 100, which is obtained by the user equipment 200, includes direction information of the fourth beam B4, the beam direction information of the base station 100 may include information about the fourth region. The user equipment 200 may perform channel estimation based on the information about the fourth region and may form a plurality of narrow beams (that is, B1' to B3') based on the channel estimation. A narrow beam may refer to a beam corresponding to each of the plurality of beams (that is, B1 to B7) formed by the base station 100. A second narrow beam B2' corresponding to the fourth beam B4 may be formed by performing the channel estimation based on the information about the fourth region.

Because the beam direction information of the base station 100 represents a specific region, the user equipment 200 may perform channel estimation in a limited range. Therefore, the accuracy of the channel estimation may improve, and the channel estimation may be performed at relatively high speed. In other words, because the complexity of reception in the user equipment 200 may be reduced and the performance of channel estimation may improve, a beam may be more quickly formed, thereby reducing signal attenuation in a millimeter-wave band.

In some embodiments, the user equipment 200 may obtain the beam direction information of the base station 100, based on a signal received from the base station 100. For example, when the user equipment 200 performs initial access or discontinuous reception (DRX), the user equipment 200 may receive a plurality of synchronization signal blocks (SSBs) from the base station 100. Each of the plurality of SSBs may include an SSB index, and the beam direction information of the base station 100 may be matched to the SSB index. The matching between the beam direction information of the base station 100 and the SSB index may be predetermined or may be transmitted to the user equipment 200 while included in a master information block (MIB). Some embodiments, in which the beam direction information of the base station 100 is matched to the SSB index and the user equipment 200 obtains the beam direction information of the base station 100, are described below with reference to FIG. 6.

For example, the beam direction information of the base station 100, which is matched to the SSB index, may be included in one of a system information block (SIB), a radio resource control (RRC) signal, and a medium access control control element (MAC CE). When the user equipment 200 has been connected with the base station 100, in other words, when the user equipment 200 operates in an RRC connected mode, the user equipment 200 may obtain the beam direction information of the base station 100, which is matched to the SSB index, through one of the RRC signal and the MAC CE.

For example, when the user equipment 200 performs beamforming based on a channel state information-reference signal (CSI-RS), the beam direction information of the base station 100 may be matched to a precoding matrix indicator (PMI). The matching between the PMI and the beam direction information of the base station 100 may be predetermined or may be transmitted to the user equipment 200 through one of the SIB, the RRC signal, and the MAC CE.

For example, when the user equipment 200 performs beamforming based on sounding reference signal (SRS) antenna switching of time division duplex (TDD), the base station 100 may transmit the beam direction information of the base station 100 to the user equipment 200 while the beam direction information of the base station 100 is included in downlink control information (DCI). The base station 100 may transmit the beam direction information of the base station 100 to the user equipment 200 while the whole beam direction information of the base station 100 is included in the DCI or while some of the beam direction information of the base station 100 is included in the DCI and the remaining information is included in the RRC signal or the MAC CE.

For example, the base station 100 may transmit the beam direction information of the base station 100, which is matched to the SSB index or the PMI, to the user equipment 200 while the beam direction information of the base station 100 is included in the DCI. The base station 100 may transmit the beam direction information of the base station 100 to the user equipment 200 while the whole beam direction information of the base station 100 is included in the DCI or while some of the beam direction information of the base station 100 is included in the DCI and the remaining information is included in the RRC signal or the MAC CE.

In some embodiments, the beam direction information of the base station 100 may be matched to some bits of the SSB index or to some bits of the PMI. For example, the total bits of the SSB index may be 6 bits, and the beam direction information of the base station 100 may be matched to 3 bits that are portions of 6 bits.

Figure 2:
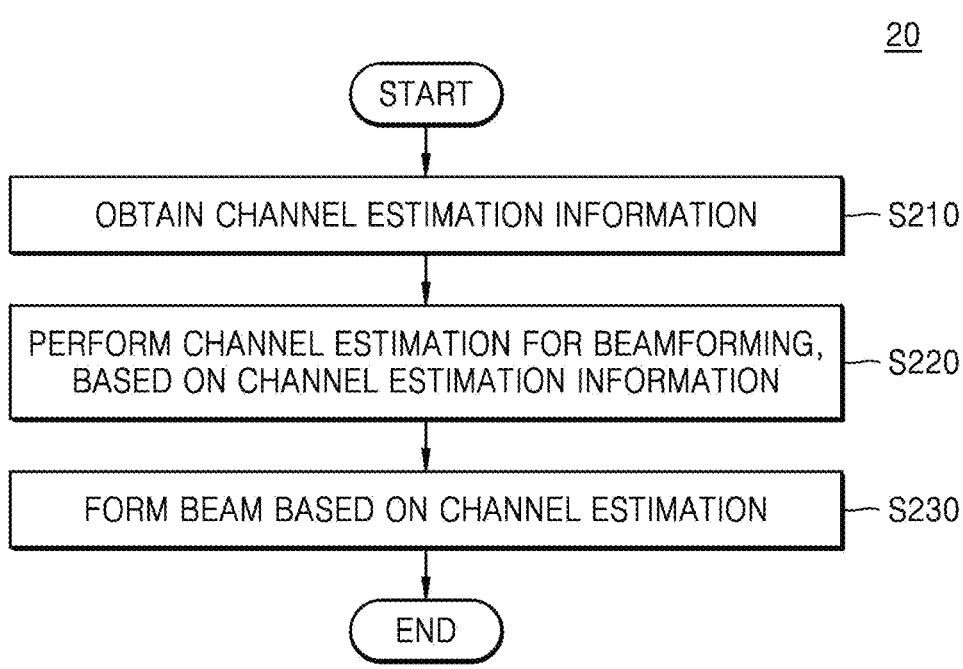
FIG. 2 is a flowchart illustrating an operation method of a user equipment in a wireless communication system, according to one or more embodiments.

FIG. 2 is a flowchart illustrating an operation method of a user equipment in a wireless communication system, according to one or more embodiments. As shown in FIG. 2, an operation method 20 of a user equipment in a wireless communication system includes a plurality of operations S210 to S230.

Referring to FIGS. 1 and 2, in operation S210, the user equipment 200 or the base station 100 may obtain channel estimation information. In some embodiments, the channel estimation information may include the beam direction information of the base station 100, and the beam direction information of the base station 100 may be formed based on the geographic coordinate system. The user equipment 200 may obtain the beam direction information of the base station 100, based on a signal received from the base station 100.

For example, the beam direction information of the base station 100 may be matched to the SSB index. The matching between the beam direction information of the base station 100 and the SSB index may be predetermined or may be transmitted to the user equipment 200 while included in the MIB. The beam direction information of the base station 100, which is matched to the SSB index, may be included in one of the SIB, the RRC signal, and the MAC CE.

For example, the beam direction information of the base station 100 may be matched to the PMI. The matching between the PMI and the beam direction information of the base station 100 may be predetermined or may be transmitted to the user equipment 200 through one of the SIB, the RRC signal, and the MAC CE.

For example, the base station 100 may transmit the beam direction information of the base station 100 to the user equipment 200 while the beam direction information of the base station 100 is included in the DCI. The base station 100 may transmit the beam direction information of the base station 100 to the user equipment 200 while the whole beam direction information of the base station 100 is included in the DCI or while some of the beam direction information of the base station 100 is included in the DCI and the remaining information is included in the RRC signal or the MAC CE.

In some embodiments, the channel estimation information may include beam direction information of the user equipment 200, and the beam direction information of the user equipment 200 may be formed based on the geographic coordinate system. The base station 100 may obtain the beam direction information of the user equipment 200, based on a signal received from the user equipment 200.

In some embodiments, the channel estimation information may include location information of the base station 100. The location information of the base station 100 may be formed based on the geographic coordinate system. For example, the location information of the base station 100 may include or may not include elevation information. The elevation information may be represented by a height above sea level or an elevation above ground level. When the elevation information is not included in the location information of the base station 100, general base station height information may be used or an elevation angle relative to the surface of earth may be approximated as 0°.

In some embodiments, the base station 100 or the user equipment 200 may obtain the location information of the base station 100 by various methods. For example, the base station 100 may obtain the location information of the base station 100 by using a global navigation satellite system (GNSS), such as a global positioning system (GPS), Galieo, or Beidou, or by using an indoor positioning system (IPS) in the case of an indoor environment. Because the base station 100 may refer to a fixed station, the location information of the base station 100 may be obtained by a method other than the GNSS or the ISP.

For example, the user equipment 200 may obtain the location information of the base station 100 from the base station 100 by using a broadcasting or groupcast channel. The broadcasting or groupcast channel may refer to a communication method used by the base station 100 to collectively communicate with at least one user equipment.

In some embodiments, the channel estimation information may include location information of the user equipment 200. The location information of the user equipment 200 may be formed based on the geographic coordinate system. The base station 100 or the user equipment 200 may obtain the location information of the user equipment 200 by various methods. For example, the user equipment 200 may obtain the location information of the user equipment 200 by using a GNSS, such as a GPS, Galieo, or Beidou, or by using an IPS in the case of an indoor environment.

For example, the user equipment 200 may cyclically transmit the location information of the user equipment 200 to the base station 100 or may transmit the location information of the user equipment 200 only when there is a request from the base station 100. For example, the location information of the user equipment 200 may include absolute location information or a change value of the absolute location information. The absolute location information may refer to location information including at least one of a specific longitude range, a specific latitude range, or a specific elevation range based on the geographic coordinate system. The change value of the absolute location information may refer to a difference value between the absolute location information at specific time and the absolute location information at the time at which the user equipment 200 transmits the location information of the user equipment 200 after the specific time. For example, when the user equipment 200 hierarchically structures the location information of the user equipment 200 and transmits highly frequent location information to the base station 100, the amount of transferred information may be reduced by transferring only location information within the relevant area.

In some embodiments, the user equipment 200 may obtain the beam direction information of the base station 100, based on the location information of the user equipment 200 and the location information of the base station 100. The base station 100 may obtain the beam direction information of the user equipment 200, based on the location information of the user equipment 200 and the location information of the base station 100. The beam direction information of the base station 100, which is obtained based on the location information, may be more precise than the beam direction information of the base station 100, which is matched to the SSB index.

In some embodiments, the channel estimation information may include timing information, and the timing information may refer to information corresponding to twice a communication distance that represents a distance between the base station 100 and the user equipment 200. The user equipment 200 or the base station 100 may obtain the timing information by using a timing advance of an uplink channel. For example, the timing advance of the uplink channel may include the timing information and a timing advance offset. The base station 100 may align a time point of transmitting a downlink to the user equipment 200 with a time point of receiving an uplink from the user equipment 200 and thus cause the timing information to correspond to twice the communication distance. The timing advance offset may be an offset for adjusting transmission timings of the user equipment 200 and another user equipment.

In some embodiments, the base station 100 may obtain the timing information by using the timing advance of the uplink channel based on oversampling. The oversampling may refer to obtaining the timing information by relatively increasing a sampling rate. When the timing information is obtained based on oversampling, the base station 100 may obtain the timing information having relatively high accuracy.

In operation S220, the user equipment 200 or the base station 100 may perform channel estimation for beamforming based on the channel estimation information. In some embodiments, the channel estimation information may include at least one of the beam direction information of the base station 100, the beam direction information of the user equipment 200, the location information of the base station 100, the location information of the user equipment 200, or the timing information, and the user equipment 200 or the base station 100 may include a plurality of element antennas. The channel estimation may refer to estimating a phase difference between the plurality of element antennas of the user equipment 200 or the base station 100 based on the channel estimation information. The user equipment 200 or the base station 100 may estimate the phase difference based on a path difference. The path difference may be differently calculated depending on the assumption of a far field or a near field, and embodiments of calculating the path difference between the plurality of element antennas are described below with reference to FIGS. 3 and 4.

In some embodiments, when performing the channel estimation based on the channel estimation information, the user equipment 200 or the base station 100 may perform the channel estimation by various algorithms. For example, the user equipment 200 may perform the channel estimation by a compressive sensing technique, exhaustive search, or machine learning.

In operation S230, the user equipment 200 or the base station 100 may form a beam based on the channel estimation. In some embodiments, the user equipment 200 may form a best beam corresponding to a beam formed by the base station 100, based on the channel estimation, and the base station 100 may form a best beam corresponding to a beam formed by the user equipment 200, based on the channel estimation. The user equipment 200 or the base station 100 may relatively quickly form a beam based on various channel estimation information. The best beam of the base station 100 and the best beam of the user equipment 200 may form a pair. For example, the channel estimation information may include specific location information or specific direction information, which is formed based on the geographic coordinate system, or may include location information or direction information, which is specified by a range. Because the user equipment 200 or the base station 100 may perform channel estimation based on a specific value or a specific range value, the accuracy of the channel estimation may improve, and the channel estimation may be performed at relatively high speed. Therefore, the user equipment 200 or the base station 100 may relatively quickly form a beam and may reduce signal attenuation in a millimeter-wave band.

Figure 3:
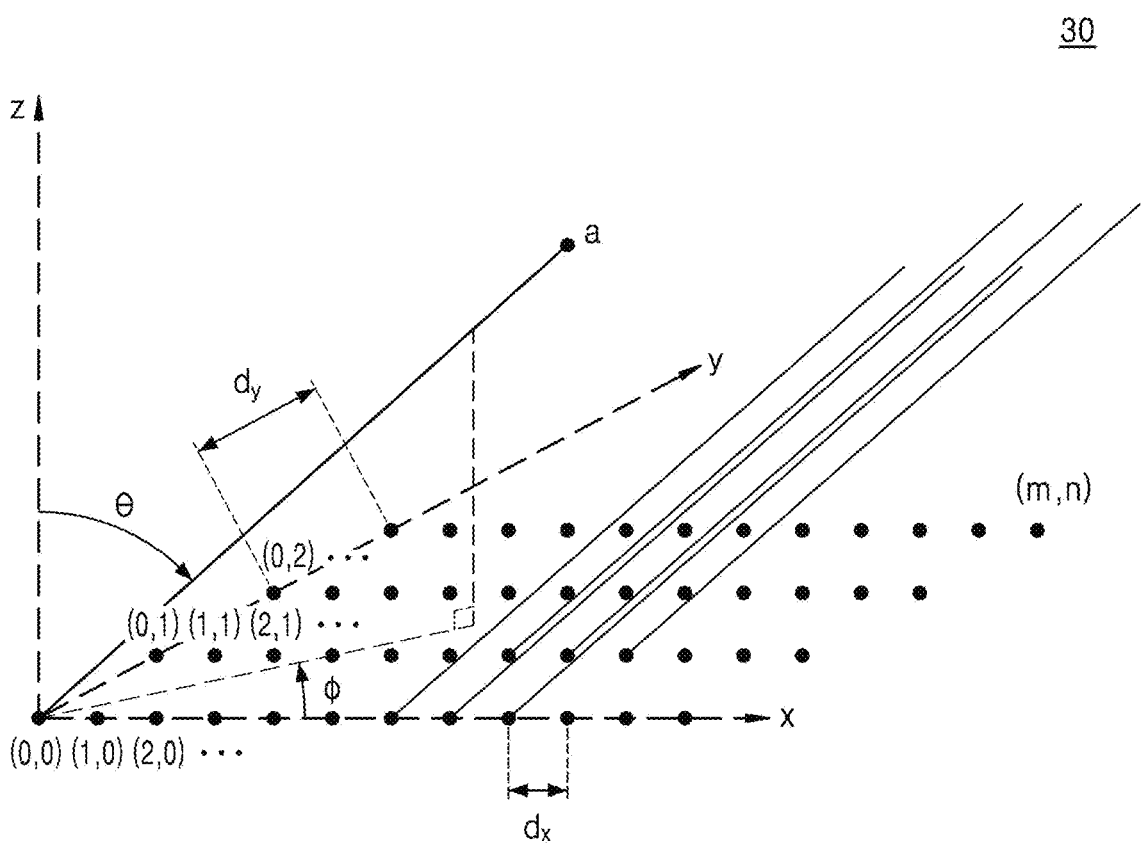
FIG. 3 is a graph illustrating channel estimation for beamforming, which is performed by a user equipment under the assumption of a far field situation, according to one or more embodiments.

FIG. 3 is a graph illustrating channel estimation for beamforming under the assumption of a far-field situation, according to one or more embodiments.

Referring to FIGS. 1 and 3, a first graph 30 may be a graph illustrating channel estimation for beamforming, which is performed by the user equipment 200 or the base station 100 under the assumption of a far-field situation. The channel estimation for beamforming may refer to estimating a phase difference between a plurality of element antennas. The first graph 30 may be a 3-dimensional graph based on the geographic coordinate system.

In some embodiments, the user equipment 200 or the base station 100 may include a plurality of element antennas, and the plurality of element antennas may correspond to a 2-dimensional (2D) planar array antenna in which m element antennas (where m is a natural number) are arranged at first intervals $d_x$ in an x-axis direction and n element antennas (where n is a natural number) are arranged at second intervals $d_y$ in a y-axis direction. It is assumed that the first interval $d_x$ is equal to the second interval $d_y$, but the disclosure is not limited thereto.

In some embodiments, when the m*n element antennas are element antennas of the user equipment 200, the base station 100 may be located at a first location (a), and when the m*n element antennas are element antennas of the base station 100, the user equipment 200 may be located at the first location (a). The far-field situation may refer to the case where the distance between the user equipment 200 and the base station 100 is relatively large, and when the far-field situation is assumed, angles of signals respectively transmitted to or respectively received by the m*n element antennas from the first location (a) may be approximated to be equal to each other. The angle of the signal transmitted to or received by each of the m*n element antennas from the first location (a) may be referred to as a transmission/ reception angle, an angle of arrival (AOA), an angle of departure (AOD), or the like and, hereinafter, may be referred to as a transmission/reception angle.

In some embodiments, the user equipment 200 or the base station 100 may calculate the path difference between the plurality of element antennas and may estimate the phase difference between the plurality of element antennas based on the calculated path difference.

For example, the path difference between a first element antenna (0,0) and a second element antenna (m,n) may be calculated based on Equation 2 shown below.

$$\Delta r = m \cdot d_x \sin\theta\cos\varphi + n \cdot d_y \sin\theta\sin\varphi \qquad \text{[Equation 2]}$$

$\Delta r$ may represent the path difference between the first element antenna (0,0) and the second element antenna (m,n), $\theta$ may represent an elevation angle in the geographic coordinate system, and $\varphi$ may represent a longitude angle in the geographic coordinate system. The transmission/reception angle may include at least one of $\theta$ or $\varphi$. The user equipment 200 or the base station 100 may estimate the phase difference between the first element antenna (0,0) and the second element antenna (m,n) according to Equation 1, based on the path difference calculated according to Equation 2.

In some embodiments, the user equipment 200 or the base station 100 may estimate the transmission/reception angle based on channel estimation information including at least one of the beam direction information of the base station 100, the beam direction information of the user equipment 200, the location information of the base station 100, or the location information of the user equipment 200 and may form a beam by performing channel estimation based on the estimated transmission/reception angle.

In some embodiments, when the difference in elevation between the user equipment 200 and the base station 100 is not large, $\theta$ may be approximated as $\pi/2$, and when the plurality of element antennas correspond to a 1-dimensional (1D) uniform linear array antenna, n may be 1 and Equation 2 may be represented by Equation 3 shown below.

$$\Delta r = m \cdot d_x \cos\varphi \qquad \text{[Equation 3]}$$

The user equipment 200 or the base station 100 may estimate $\varphi$ based on the channel estimation information including at least one of the beam direction information of the base station 100, the beam direction information of the user equipment 200, the location information of the base station 100, or the location information of the user equipment 200 and may form a beam by performing channel estimation based on the estimated φ and Equation 3.

Figure 4:
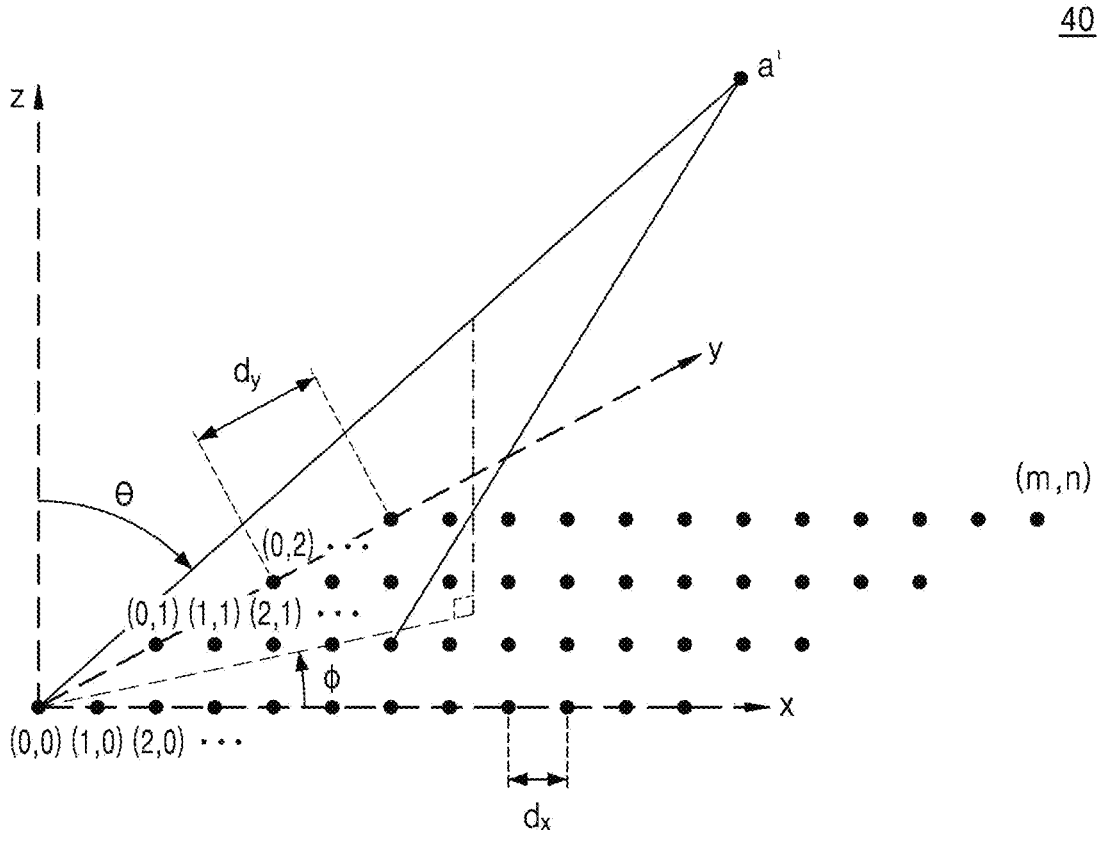
FIG. 4 is a graph illustrating channel estimation for beamforming, which is performed by a user equipment under the assumption of a near field situation, according to one or more embodiments.

FIG. 4 is a graph illustrating channel estimation for beamforming under the assumption of a near-field situation, according to one or more embodiments.

Referring to FIGS. 1 and 4, a second graph 40 may be a graph illustrating channel estimation for beamforming, which is performed by the user equipment 200 or the base station 100 under the assumption of a near-field situation. The channel estimation for beamforming may refer to estimating a phase difference between a plurality of element antennas. The second graph 40 may be a 3-dimensional graph based on the geographic coordinate system.

In some embodiments, the user equipment 200 or the base station 100 may include a plurality of element antennas, and the plurality of element antennas may correspond to a 2D planar array antenna in which m element antennas (where m is a natural number) are arranged at the first intervals $d_x$ in the x-axis direction and n element antennas (where n is a natural number) are arranged at the second intervals $d_y$ in the y-axis direction. It is assumed that the first interval $d_x$ is equal to the second interval $d_y$, but the disclosure is not limited thereto.

In some embodiments, when the m*n element antennas are element antennas of the user equipment 200, the base station 100 may be located at a second location (a'), and when the m*n element antennas are element antennas of the base station 100, the user equipment 200 may be located at the second location (a'). The near-field situation may refer to the case where the distance between the user equipment 200 and the base station 100 is relatively small, and when the near-field situation is assumed, angles of signals respectively transmitted to or respectively received by the m*n element antennas from the second location (a') are unable to be approximated to be equal to each other. That is, the angles of the signals respectively transmitted to or respectively received by the m*n element antennas may be different. The angle of the signal transmitted to or received by each of the m*n element antennas from the second location (a') may be referred to as a transmission/reception angle, an AOA, an AOD, or the like and, hereinafter, may be referred to as a transmission/reception angle.

In some embodiments, the user equipment 200 or the base station 100 may calculate the path difference between the plurality of element antennas and may estimate the phase difference between the plurality of element antennas based on the calculated path difference.

For example, the path difference between a first element antenna (0,0) and a second element antenna (m,n) may be calculated based on Equation 4 shown below.

$$\Delta r = r - \sqrt{r^2 - 2rmd_x \sin\theta\cos\varphi - 2rnd_y\sin\theta\sin\varphi + (md_x)^2 + (nd_y)^2} \qquad \text{[Equation 4]}$$

Δr may represent the path difference between the first element antenna (0,0) and the second element antenna (m,n), θ may represent an elevation angle in the geographic coordinate system, and φ may represent a longitude angle in the geographic coordinate system. The transmission/reception angle may include θ and φ. r may represent a communication distance that is the distance between the base station 100 and the user equipment 200. The user equipment 200 or the base station 100 may estimate the phase difference between the first element antenna (0,0) and the second element antenna (m,n) according to Equation 1, based on the path difference calculated according to Equation 4.

In some embodiments, the user equipment 200 or the base station 100 may estimate the transmission/reception angle based on channel estimation information including at least one of the beam direction information of the base station 100, the beam direction information of the user equipment 200, the location information of the base station 100, or the location information of the user equipment 200.

In some embodiments, the user equipment 200 or the base station 100 may estimate the communication distance based on the channel estimation information including at least one of the location information of the base station 100, the location information of the user equipment 200, or the timing information.

The user equipment 200 or the base station 100 may form a beam by performing channel estimation based on the estimated transmission/reception angle and the estimated communication distance. Because the communication distance as well as the transmission/reception angle needs to be estimated under the assumption of a near-field situation, the performance of channel estimation may deteriorate and the complexity of reception may be increased. However, according to one or more embodiments, because the user equipment 200 or the base station 100 estimates the communication distance based on the channel estimation information including at least one of the location information of the base station 100, the location information of the user equipment 200, or the timing information, the accuracy of the channel estimation may improve and the complexity of reception may be reduced.

In some embodiments, Equation 4 may be approximated as Equation 5 by using a Taylor series or a Taylor expansion. A Taylor series may refer to a method of representing an analytic function by the infinite sum of terms that are expressed in the function's derivatives at a single point.

$$\Delta r \approx md_x\sin\theta\cos\varphi + nd_y\sin\theta\sin\varphi - \frac{(md_x)^2 + (nd_y)^2}{2r} \qquad \text{[Equation 5]}$$

The user equipment 200 or the base station 100 may estimate the transmission/reception angle and the communication distance based on the channel estimation information and may form a beam by performing channel estimation based on Equation 5.

In some embodiments, when the difference in elevation between the base station 100 and the user equipment 200 is not large or when the communication distance is relatively larger than the difference in elevation between the base station 100 and the user equipment 200, θ may be approximated as π/2, and when the plurality of element antennas correspond to a 1D uniform linear array antenna, n may be 1 and Equation 5 may be represented by Equation 6 shown below.

$$\Delta r \approx m \cdot d_x\cos\varphi - \frac{(md_x)^2}{2r} \qquad \text{[Equation 6]}$$

The user equipment 200 or the base station 100 may estimate the transmission/reception angle and the communication distance based on the channel estimation information and may form a beam by performing channel estimation based on Equation 6.

Figure 5:
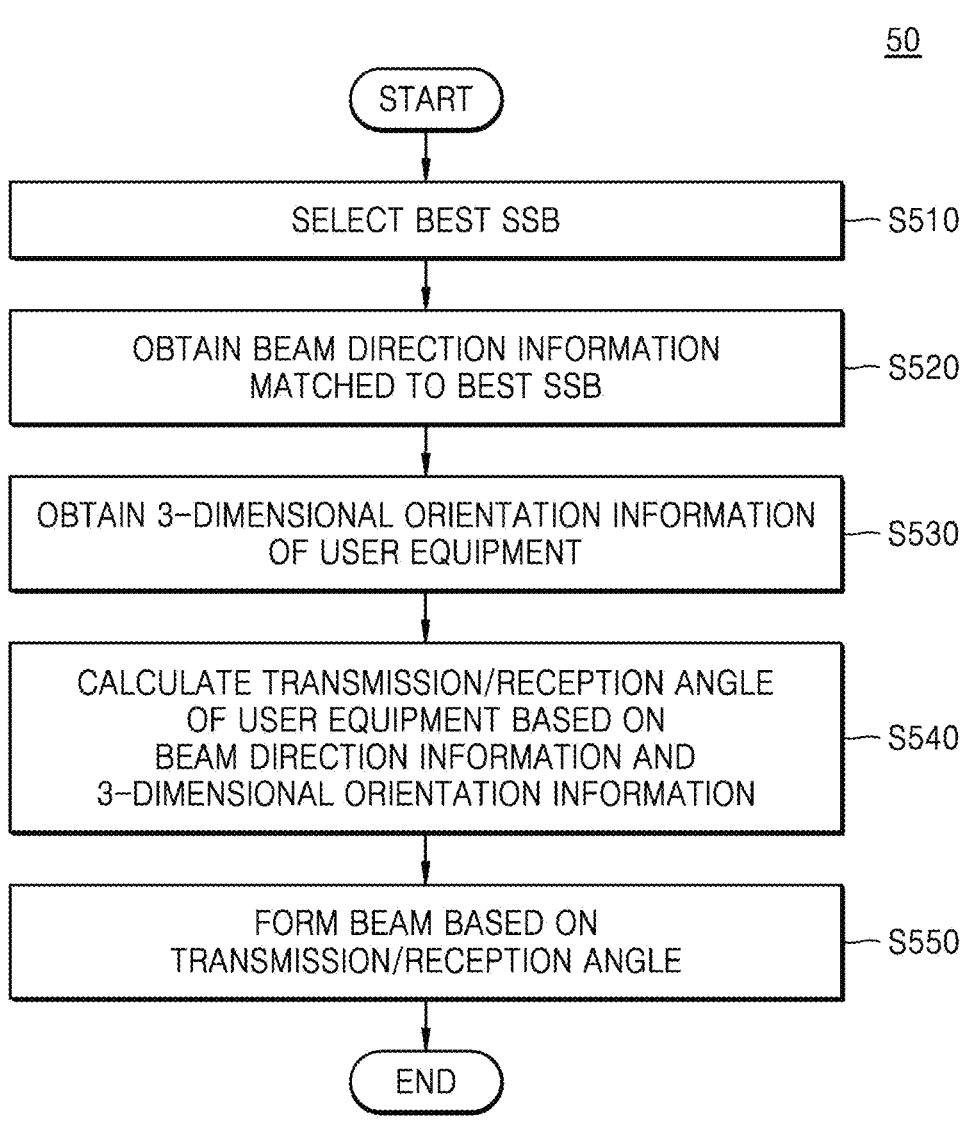
FIG. 5 is a flowchart illustrating an operation method of a user equipment in a wireless communication system, according to one or more embodiments.

FIG. 5 is a flowchart illustrating an operation method of a user equipment in a wireless communication system, according to one or more embodiments. As shown in FIG. 5, an operation method 50 of a user equipment in a wireless communication system includes a plurality of operations S510 to S550.

Referring to FIGS. 1 and 5, in operation S510, the user equipment 200 may select a best SSB. In some embodiments, the user equipment 200 may select a best SSB from among a plurality of SSBs received from the base station 100. For example, when the user equipment 200 performs initial access or DRX, the user equipment 200 may receive a plurality of SSBs from the base station 100. The user equipment 200 may select the best SSB from among the plurality of SSBs, based on one of a received signal strength indicator (RSSI), reference signal received power (RSRP), and a reference signal-to-noise ratio. The best SSB may refer to an SSB having greatest signal strength based on the RSSI, the RSRP, or the reference signal-to-noise ratio, among the plurality of SSBs.

In operation S520, the user equipment 200 may obtain beam direction information matched to the best SSB. In some embodiments, the beam direction information of the base station 100 may be matched to the SSB index of the best SSB and may include direction information of a specific region, which is formed based on the geographic coordinate system. The matching between the beam direction information of the base station 100 and the SSB index may be predetermined or may be transmitted to the user equipment 200 while included in the MIB. Some embodiments, in which the beam direction information of the base station 100 is matched to the SSB index and the user equipment 200 obtains the beam direction information of the base station 100, are described below with reference to FIG. 6.

In operation S530, the user equipment 200 may obtain 3-dimensional orientation information of the user equipment 200. The 3-dimensional orientation information may refer to orientation or rotation. For example, the 3-dimensional orientation information may be obtained by a sensor of the user equipment 200 or the like.

In operation S540, the user equipment 200 may calculate the transmission/reception angle of the user equipment 200 based on the beam direction information of the base station 100 and the 3-dimensional orientation information of the user equipment 200. In some embodiments, channel estimation information may include the beam direction information of the base station 100 and the 3-dimensional orientation information of the user equipment 200, and the user equipment 200 may calculate the transmission/reception angle of the user equipment 200 based on the channel estimation information. The transmission/reception angle of the user equipment 200 may refer to transmission/reception angles of a plurality of element antennas that are included in the user equipment 200.

In some embodiments, the channel estimation information may include the beam direction information of the base station 100, the 3-dimensional orientation information of the user equipment 200, and mounting position information of the plurality of element antennas of the user equipment 200. The user equipment 200 may calculate the transmission/reception angles of the plurality of element antennas based on the channel estimation information.

In operation S550, the user equipment 200 may form a beam based on the calculated transmission/reception angle of the user equipment 200. In some embodiments, the user equipment 200 may form a beam under the assumption of a far-field situation or a near-field situation.

For example, when the user equipment 200 performs initial access or DRX, because a relatively wide beam is used, the user equipment 200 may form a beam corresponding to a beam formed by the base station 100, based on the transmission/reception angle calculated under the assumption of a far-field situation.

For example, when the user equipment 200 has stored the location information of the base station 100 after the user equipment 200 accessed the base station 100 in the past, because the user equipment 200 may calculate the communication distance based on the location information of the base station 100 and the location information of the user equipment 200, the user equipment 200 may form a beam corresponding to a beam formed by the base station 100, based on the transmission/reception angle calculated under the assumption of a near-field situation and the communication distance.

The user equipment 200 may relatively quickly form a beam based on various channel estimation information, thereby reducing signal attenuation in a millimeter-wave band.

Figure 6:
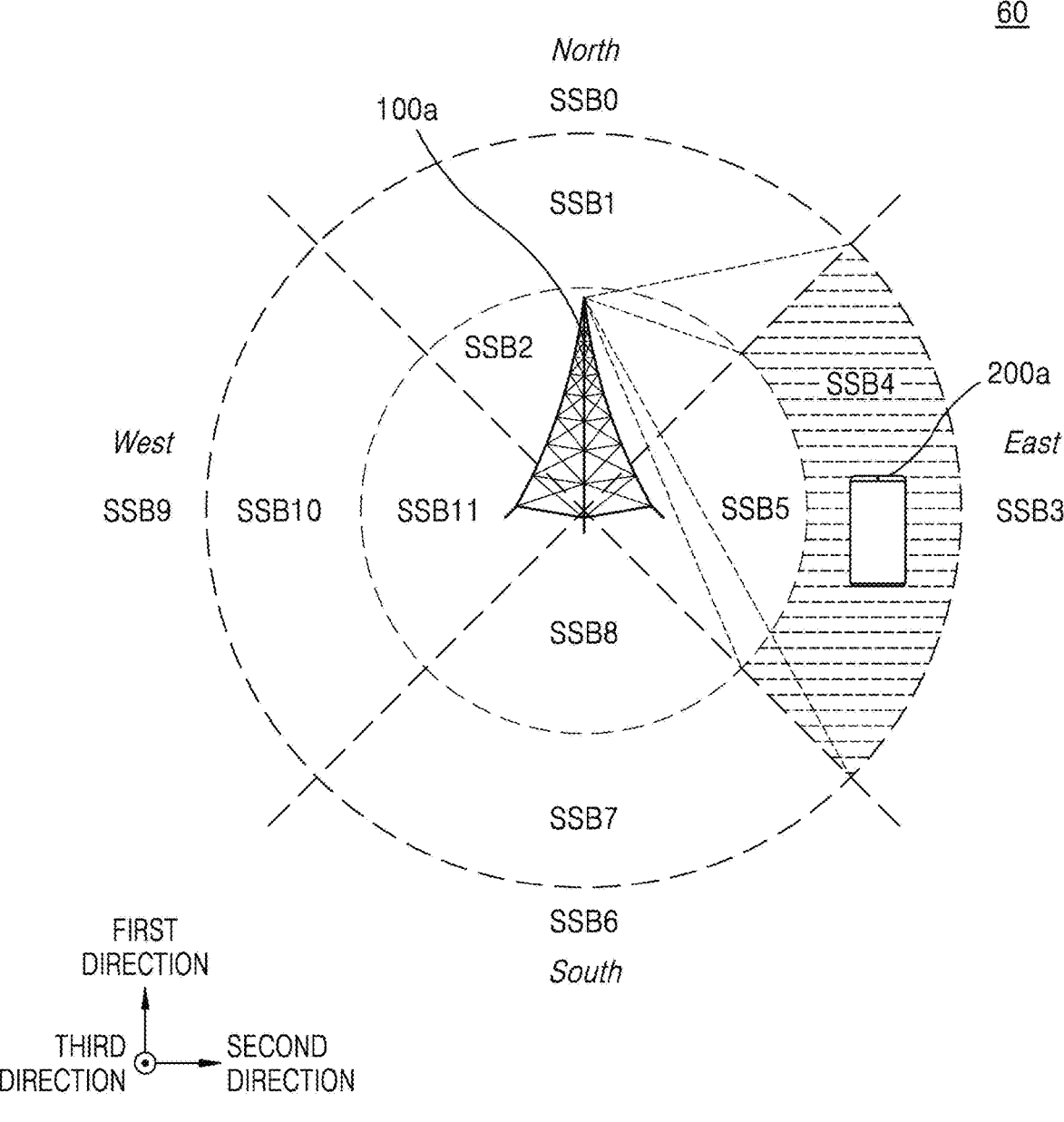
FIG. 6 is a block diagram illustrating beam direction information received by a user equipment in a wireless communication system, according to one or more embodiments.

FIG. 6 is a block diagram illustrating beam direction information received by a user equipment in a wireless communication system, according to one or more embodiments. In some embodiments, a user equipment 200a and a base station 100a in FIG. 6 may be examples of the user equipment 200 and the base station 100 in FIG. 1, respectively, and repeated descriptions given with reference to FIG. 1 are omitted.

Referring to FIGS. 1 and 6, a coordinate system 60 may include a geographic coordinate system. A first direction may represent north, an opposite direction to the first direction may represent south, a second direction may represent east, and an opposite direction to the second direction may represent west. A third direction may represent an elevation.

In some embodiments, when the user equipment 200a performs initial access or DRX, the user equipment 200a may receive a plurality of SSBs from the base station 100a. For example, each of the plurality of SSBs may include an SSB index (that is, one of SSB0 to SSB11).

In some embodiments, the SSB index (that is, one of SSB0 to SSB11) may be matched with beam direction information of the base station 100a. For example, each of the SSB indices (that is, SSB0 to SSB11) may be matched with a different specific region. A specific region may be a region including at least one of a specific longitude range, a specific latitude range, or a specific elevation range based on the geographic coordinate system. The coordinate system 60 may be divided into 12 regions. For example, in operation S510 of FIG. 5, when the index of the best SSB selected by the user equipment 200a is a fourth SSB index SSB4, the transmission/reception angle of the user equipment 200a may be calculated based on a region matched to the fourth SSB index SSB4, among the 12 regions. The user equipment 200a may form a beam under the assumption of a far-field situation.

In some embodiments, each of the SSB indices (that is, SSB0 to SSB11) may be matched with different time information, and the user equipment 200a may form a beam in correspondence with direction information matched with the SSB index (that is, one of SSB0 to SSB11), based on the matched time information. Because the beam is formed to correspond to the direction information, the beam may be formed relatively narrowly but up to a far place, thereby allowing cell coverage to be expanded. Cell coverage may refer to an area in which the communication between the base station 100 and the user equipment 200a is able to be made.

In some embodiments, when the user equipment 200a has obtained the location information of the base station 100a and the location information of the user equipment 200a in the coordinate system 60, the user equipment 200a may calculate the transmission/reception angle of the user equipment 200a and the communication distance, based on the location information of the base station 100a and the location information of the user equipment 200a. For example, when the location information of the base station 100a and the location information of the user equipment 200a are precise, the user equipment 200a may calculate the transmission/reception angle and the communication distance based on the location information of the base station 100a and the location information of the user equipment 200a and may form a beam under the assumption of a near-field situation based on the transmission/reception angle and the communication distance. For example, even when the location information of the base station 100a and the location information of the user equipment 200a respectively include ranges, the user equipment 200a may calculate the transmission/reception angle and the communication distance based on the location information of the base station 100a and the location information of the user equipment 200a and may form a beam under the assumption of a near-field situation based on the transmission/reception angle and the communication distance.

In some embodiments, the location information of the base station 100a may include or may not include elevation information in the third direction. The elevation information may be expressed by a height above sea level, an elevation above ground level, or the like. When the location information of the base station 100a does not include the elevation information, general base station height information may be used or an elevation angle relative to the surface of earth may be approximated as 0°.

Figure 7:
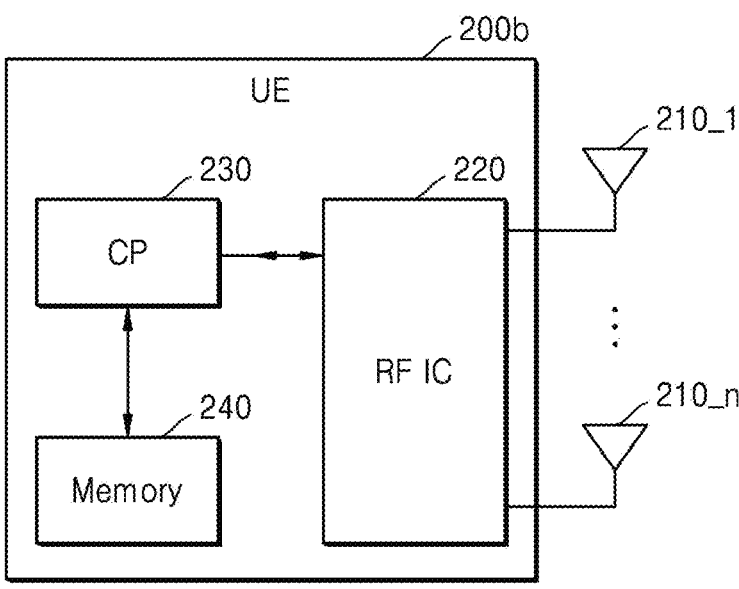
FIG. 7 is a block diagram illustrating a user equipment in a wireless communication system, according to one or more embodiments.

FIG. 7 is a block diagram illustrating a user equipment in a wireless communication system, according to one or more embodiments. In some embodiments, a user equipment 200b in FIG. 7 may be an example of the user equipment 200 in FIG. 1, and repeated descriptions given with reference to FIG. 1 are omitted.

Referring to FIGS. 1 and 7, the user equipment 200b includes a plurality of element antennas 210_1 to 210_n, a radio frequency (RF) integrated circuit 220, a communication processor 230, and a memory 240.

The RF integrated circuit 220 may receive RF signals from the base station 100 of FIG. 1 through the plurality of element antennas 210_1 to 210_n. The RF integrated circuit 220 may frequency-down-convert the received RF signals into baseband signals to generate intermediate-frequency or baseband signals. The RF integrated circuit 220 may generate data signals by filtering, decoding, and/or digitizing the intermediate-frequency or baseband signals. In addition, the RF integrated circuit 220 may encode, multiplex, and/or analogize data signals. The RF integrated circuit 220 may frequency-up-convert intermediate-frequency or baseband signals into RF signals and may transmit the RF signals through the plurality of element antennas 210_1 to 210_n. The RF integrated circuit 220 may include a transmission filter, a reception filter, an amplifier, a mixer, an oscillator, a digital-to-analog converter (DAC), an analog-to-digital converter (ADC), and the like. In addition, the RF integrated circuit 220 may further include a plurality of RF chains and may perform beamforming by using the plurality of element antennas 210_1 to 210_n. The RF integrated circuit 220 may adjust, for beamforming, the phase and magnitude of each of signals transmitted and received through the plurality of element antennas 210_1 to 210_n. Furthermore, the RF integrated circuit 220 may perform a multi-input multi-output (MIMO) operation and may receive several layers when performing the MIMO operation. The RF integrated circuit 220 may be referred to as a transmitter, a receiver, a transceiver, or a communication unit.

The communication processor 230 may control various operations of the user equipment 200b, which are related to wireless communication with the base station 100. In some embodiments, the communication processor 230 may perform channel estimation for beamforming based on various channel estimation information. For example, the channel estimation information may include at least one of the beam direction information of the base station 100, beam direction information of the user equipment 200b, the location information of the base station 100, location information of the user equipment 200b, or the timing information. The channel estimation may refer to estimating the phase difference between the plurality of element antennas 210_1 to 210_n based on the channel estimation information. The communication processor 230 may estimate the phase difference based on a path difference. The path difference may be differently calculated depending on the assumption of a far field or a near field. In some embodiments, the communication processor 230 may control the RF integrated circuit 220 to perform beamforming based on the channel estimation.

The memory 240 may have any structure storing data. For example, the memory 240 may include a volatile memory device, such as dynamic random access memory (DRAM) or static random access memory (SRAM), or a nonvolatile memory device, such as flash memory or resistive random access memory (RRAM). In some embodiments, the memory 240 may store the channel estimation information and may perform transmission and reception of the channel estimation information with respect to the communication processor 230. For example, the memory 240 may store location information of a base station that was accessed in the past, location information of a base station that is being currently accessed, the location information of the user equipment 200b, and the like and may perform transmission and reception thereof with respect to the communication processor 230.

In some embodiments, the communication processor 230 may store various channel estimation information and channel estimation corresponding thereto in the form of a look-up table in the memory 240. The look-up table may refer to a set or arrangement of results precalculated for given operations. The user equipment 200b may more quickly form an optimum beam by using the look-up table.

Figure 8:
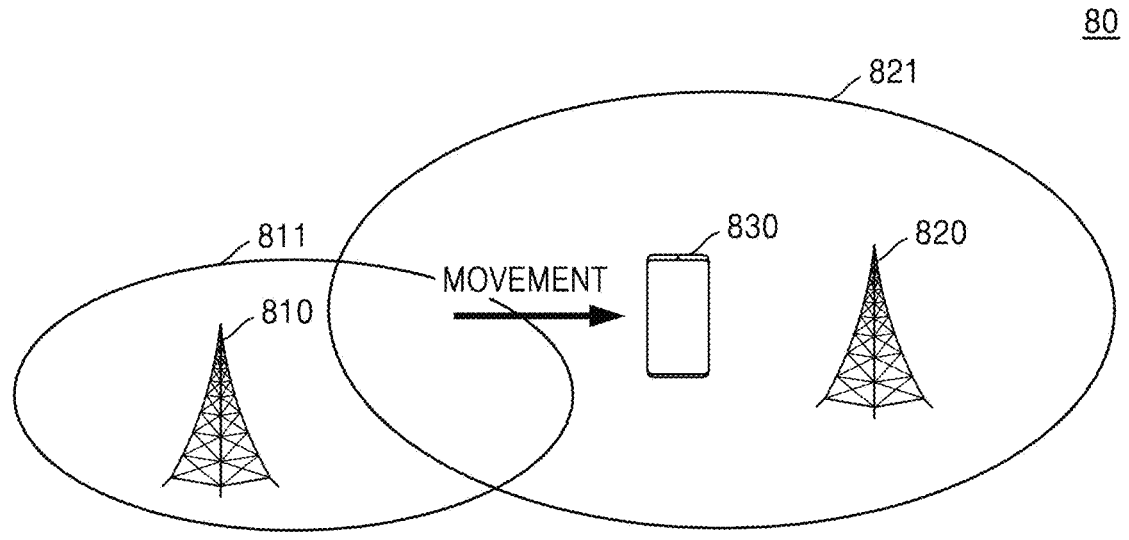
FIG. 8 is a block diagram illustrating channel estimation for beamforming, which is performed by a user equipment in a wireless communication system during a hand-over operation, according to one or more embodiments.

FIG. 8 is a block diagram illustrating channel estimation for beamforming, which is performed by a user equipment in a wireless communication system during a hand-over operation, according to one or more embodiments. As shown in FIG. 8, a wireless communication system 80 includes a user equipment 830, a base station 810, and a neighboring base station 820. In some embodiments, the user equipment 830 and the base station 810 in FIG. 8 may be examples of the user equipment 200 and the base station 100 in FIG. 1, respectively, and repeated descriptions given with reference to FIG. 1 are omitted.

A first cell area 811 may refer to an area in which communication with the base station 810 may be performed, and a second cell area 821 may refer to an area in which communication with the neighboring base station 820 may be performed. In some embodiments, the user equipment 830 may obtain channel estimation information including location information of the neighboring base station 820 from the base station 810. For example, the location information of the neighboring base station 820 may be formed based on the geographic coordinate system. For example, the location information of the neighboring base station 820 may be relative location information with respect to the location information of the base station 810. The relative location information may refer to a difference value for the location information of the neighboring base station 820 with reference to the location information of the base station 810.

Although the wireless communication system 80 is shown as including two base stations (that is, 810 and 820), the disclosure is not limited thereto. For example, the wireless communication system 80 may include a plurality of neighboring base stations, and the user equipment 830 may obtain location information of the plurality of neighboring base stations from the base station 810.

In some embodiments, the user equipment 830 may depart from the first cell area 811 to move into the second cell area 821 and may perform hand-over. When performing hand-over, the user equipment 830 may perform channel estimation for beamforming in connection with the neighboring base station 820, based on the location information of the neighboring base station 820. The hand-over may refer to a function allowing the user equipment 830 to be synchronized with a communication channel, which is allocated to a service space of another base station, and thus be connected to services of the other base station when the user equipment 830 moves from a service space (for example, the first cell area 811) of a base station (for example, the base station 810), to which the user equipment 830 is connected, into the service space (for example, the second cell area 821) of the other base station (for example, the neighboring base station 820). Because the user equipment 830 knows the location information of the neighboring base station 820, the user equipment 830 may relatively quickly perform beamforming in connection with the neighboring base station 820 when performing hand-over. Therefore, relatively quick beamforming may be supported, thereby reducing signal attenuation in a millimeter-wave band.

Figure 9:
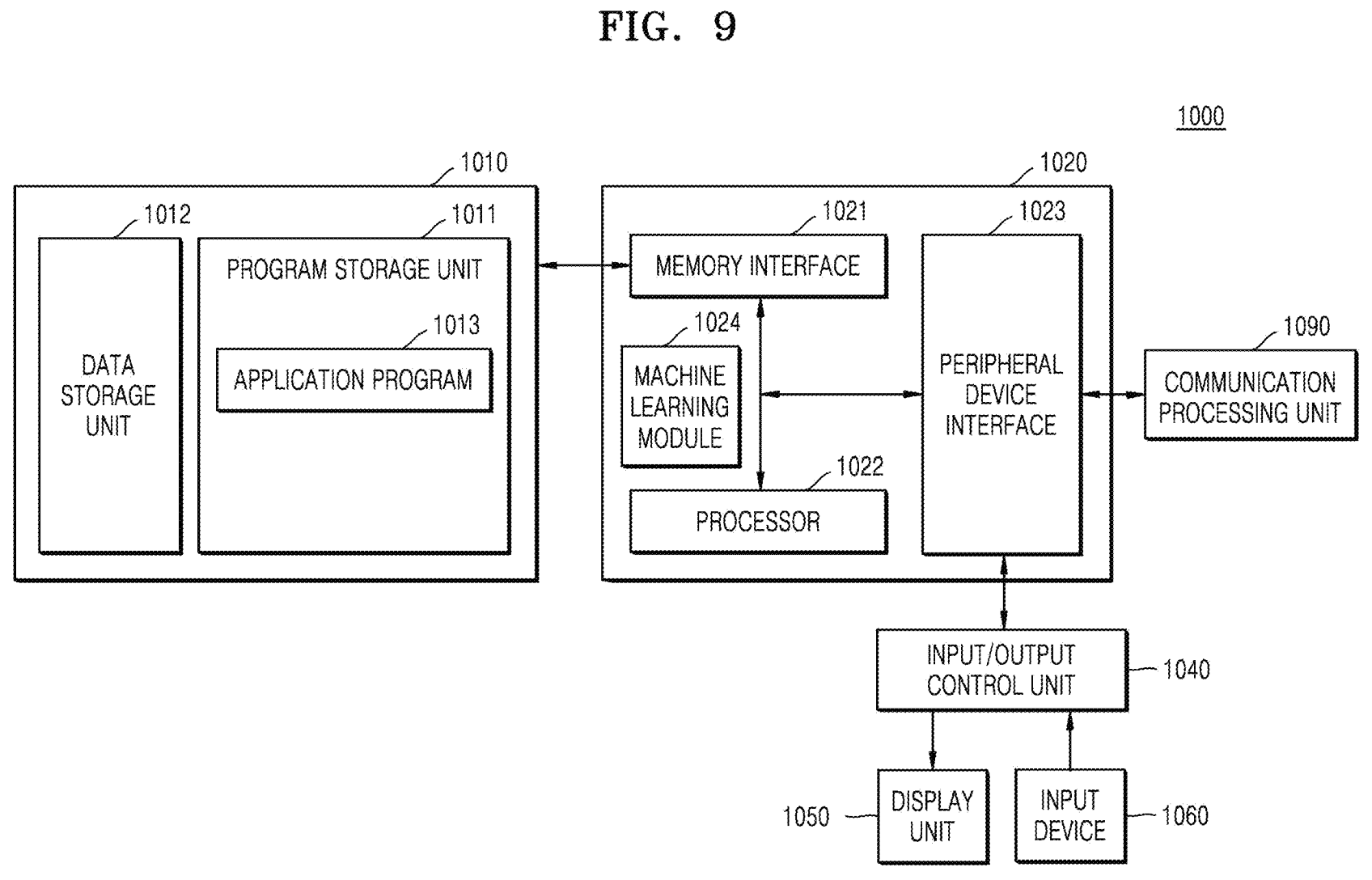

FIG. 9 is a block diagram illustrating an electronic device according to one or more embodiments.

Referring to FIG. 9, an electronic device 1000 includes a memory 1010, a processor unit 1020, an input/output control unit 1040, a display unit 1050, an input device 1060, and a communication processing unit 1090. Here, the memory 1010 may be provided in a plural number. The respective components may be described as follows.

The memory 1010 includes a program storage unit 1011, which stores a program for controlling operations of the electronic device 1000, and a data storage unit 1012, which stores data generated during the execution of the program. The data storage unit 1012 may store data required for operations of an application program 1013 or may store data generated from the operations of the application program 1013. The memory 1010 may have any structure storing data. For example, the memory 1010 may include a volatile memory device, such as DRAM or SRAM, or a nonvolatile memory device, such as flash memory or RRAM.

The program storage unit 1011 includes the application program 1013. Here, a program that is included in the program storage unit 1011 is a set of instructions and may also be expressed by an instruction set. The application program 1013 may include pieces of program code for executing various applications that operate in the electronic device 1000. That is, the application program 1013 may include pieces of code (or commands) regarding various applications driven by a processor 1022.

The electronic device 1000 includes the communication processing unit 1090 performing a communication function for voice communication and data communication. A peripheral device interface 1023 may control connection between the input/output control unit 1040, the communication processing unit 1090, the processor 1022, and a memory interface 1021. The processor 1022 controls a plurality of base stations to provide services respectively corresponding thereto by using at least one software program. Here, the processor 1022 may execute at least one program stored in the memory 1010 to provide a service corresponding to the at least one program.

The processor 1022 may perform channel estimation for beamforming based on various channel estimation information described above with reference to FIGS. 1 to 8. In some embodiments, the channel estimation information may include at least one of the beam direction information of the base station 100 of FIG. 1, beam direction information of the electronic device 1000, the location information of the base station 100 of FIG. 1, location information of the electronic device 1000, or the timing information. The processor 1022 may differently calculate the path difference between a plurality of antennas of the electronic device 1000 depending on the assumption of a far field or a near field, based on the channel estimation information, and may estimate the phase difference between the plurality of antennas of the electronic device 1000 based on the path difference. The processor 1022 may estimate the phase difference between the plurality of antennas of the electronic device 1000 by various algorithms. For example, the processor 1022 may estimate the phase difference between the plurality of antennas of the electronic device 1000 by a compressive sensing technique, exhaustive search, or machine learning. When the phase difference is estimated by machine learning, a machine learning module 1024 may be used.

Because the processor 1022 may perform channel estimation for beamforming based on various channel estimation information, a channel estimation range may be reduced, thereby supporting relatively quick beamforming. Therefore, the electronic device 1000 may reduce signal attenuation in a millimeter-wave band.

The input/output control unit 1040 may provide an interface between input/output devices, such as the display unit 1050 and the input device 1060, and the peripheral device interface 1023. The display unit 1050 displays state information, input characters, moving pictures, still pictures, and the like. For example, the display unit 1050 may display information about an application program driven by the processor 1022.

The input device 1060 may provide input data, which is generated by the selection by the electronic device 1000, to the processor unit 1020 through the input/output control unit 1040. Here, the input device 1060 may include a keypad including at least one hardware button, a touchpad sensing touch information, and the like. For example, the input device 1060 may provide touch information, such as a touch, a touch motion, or a touch release, which is sensed by the touchpad, to the processor 1022 through the input/output control unit 1040.

Figure 10:
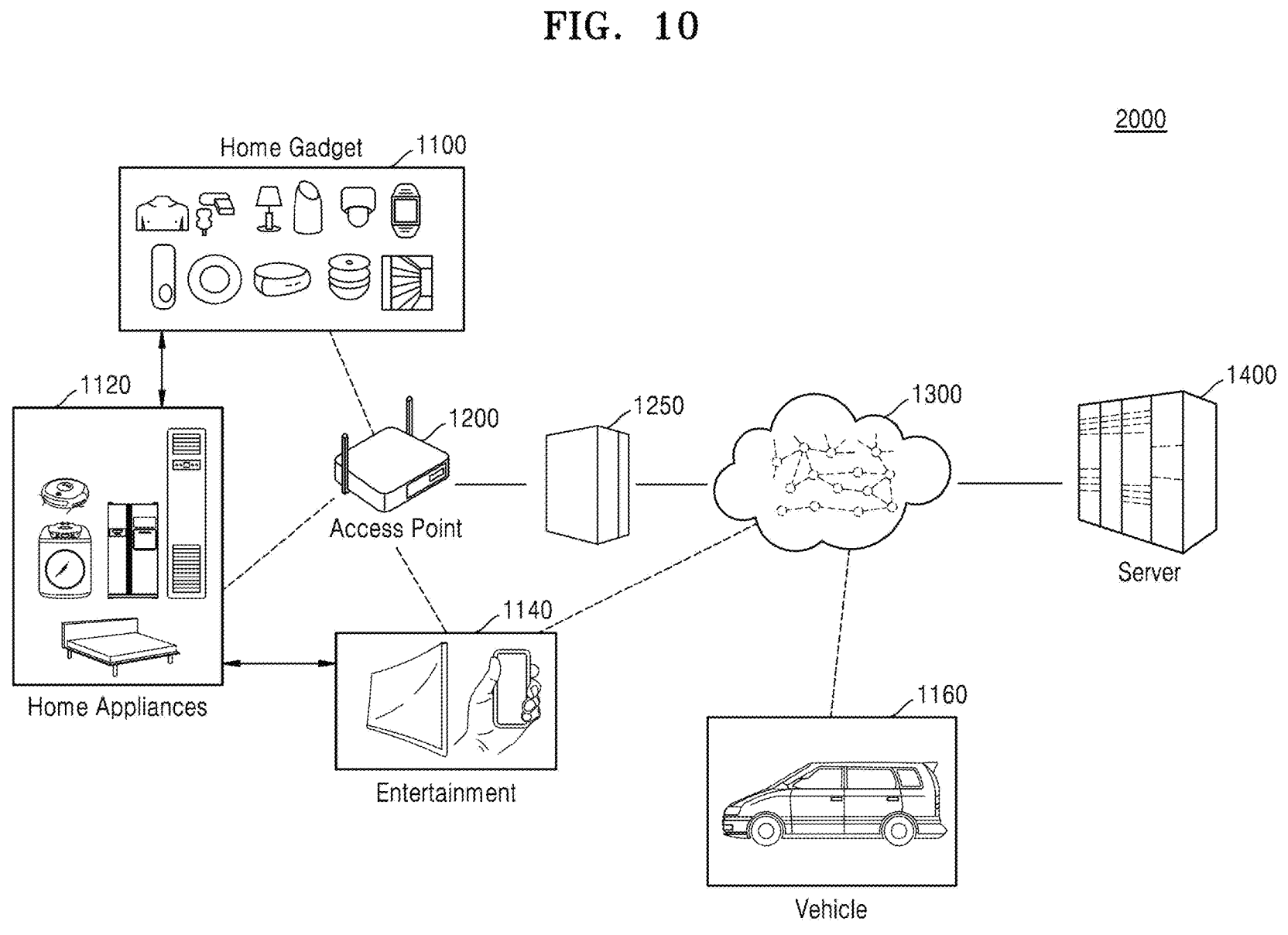

FIG. 10 is a conceptual diagram illustrating an Internet-of-Things (IoT) network system to which one or more embodiments are applied.

Referring to FIG. 10, an IoT network system 2000 includes a plurality of IoT devices (that is, 1100, 1120, 1140, and 1160), an access point 1200, a gateway 1250, a wireless network 1300, and a server 1400. IoT may refer to a network between things that use wired/wireless communication.

The IoT devices (that is, 1100, 1120, 1140, and 1160) may be grouped depending on characteristics of each IoT device. For example, the IoT devices may be grouped into a home gadget group 1100, a home appliance/furniture group 1120, an entertainment group 1140, a vehicle group 1160, and the like. A plurality of IoT devices (that is, 1100, 1120, and 1140) may each be connected to a communication network or another IoT device through the access point 1200. The access point 1200 may be embedded in one IoT device. The gateway 1250 may change a protocol such that the access point 1200 is connected to an external wireless network. The IoT devices (that is, 1100, 1120, and 1140) may be connected to an external communication network through the gateway 1250. The wireless network 1300 may include the Internet and/or a public network. The plurality of IoT devices (that is, 1100, 1120, 1140, and 1160) may be connected to the server 1400, which provides a certain service, through the wireless network 1300, and a user may use the service through at least one of the plurality of IoT devices (that is, 1100, 1120, 1140, and 1160).

According to some embodiments, each of the plurality of IoT devices (that is, 1100, 1120, 1140, and 1160) may perform channel estimation for beamforming based on various channel estimation information described above with reference to FIGS. 1 to 8. In some embodiments, the channel estimation information may include at least one of the beam direction information of the base station 100 of FIG. 1, beam direction information of the plurality of IoT devices (that is, 1100, 1120, 1140, and 1160), the location information of the base station 100 of FIG. 1, location information of the plurality of IoT devices (that is, 1100, 1120, 1140, and 1160), or the timing information. Each of the plurality of IoT devices (that is, 1100, 1120, 1140, and 1160) may differently calculate the path difference between a plurality of antennas of each of the plurality of IoT devices (that is, 1100, 1120, 1140, and 1160) depending on the assumption of a far field or a near field and may estimate the phase difference between the plurality of antennas of each of the plurality of IoT devices (that is, 1100, 1120, 1140, and 1160). Each of the plurality of IoT devices (that is, 1100, 1120, 1140, and 1160) may estimate the phase difference between the plurality of antennas of each of the plurality of IoT devices (that is, 1100, 1120, 1140, and 1160) by various algorithms. For example, each of the plurality of IoT devices (that is, 1100, 1120, 1140, and 1160) may estimate the phase difference between the plurality of antennas of each of the plurality of IoT devices (that is, 1100, 1120, 1140, and 1160) by a compressive sensing technique, exhaustive search, or machine learning.

Because each of the plurality of IoT devices (that is, 1100, 1120, 1140, and 1160) may perform channel estimation for beamforming based on various channel estimation information, a channel estimation range may be reduced, thereby supporting relatively quick beamforming. Therefore, each of the plurality of IoT devices (that is, 1100, 1120, 1140, and 1160) may reduce signal attenuation in a millimeter-wave band.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the disclosure has been particularly shown and described with reference to embodiments thereof, it will be understood that various changes in form and details may be made therein without departing from the spirit and scope of the following claims.

What is claimed is:

1. An operation method of a user equipment comprising a plurality of element antennas, the operation method comprising:

obtaining channel estimation information comprising beam direction information of a base station;

performing channel estimation for beamforming based on the channel estimation information; and forming a beam based on the channel estimation, wherein the beam direction information of the base station is generated using a geographic coordinate system.

2. The operation method of claim 1, wherein the performing of the channel estimation comprises:

estimating a plurality of transmission/reception angles of two element antennas among the plurality of element antennas, based on the channel estimation information; and estimating a phase difference between the two element antennas based on the plurality of transmission/reception angles, wherein the plurality of transmission/reception angles of the two element antennas are the same.

3. The operation method of claim 1, wherein the performing of the channel estimation comprises:

estimating a plurality of transmission/reception angles of two element antennas among the plurality of element antennas and a communication distance, based on the channel estimation information; and estimating a phase difference between the two element antennas based on the plurality of transmission/reception angles, wherein the plurality of transmission/reception angles of the two element antennas are different, and wherein the communication distance is a distance between the base station and the user equipment.

4. The operation method of claim 3, wherein the channel estimation information further comprises location information of the base station and location information of the user equipment, and the communication distance is estimated based on the location information of the base station and the location information of the user equipment.

5. The operation method of claim 3, wherein the channel estimation information further comprises timing information corresponding to twice the communication distance, and the communication distance is estimated based on the timing information.

6. The operation method of claim 5, wherein the timing information is obtained based on oversampling.

7. The operation method of claim 1, wherein the beam direction information of the base station comprises at least one of i) an elevation angle with reference to a surface of earth, or ii) an azimuth angle.

8. The operation method of claim 1, wherein the beam direction information of the base station is matched to a synchronization signal block (SSB) index or a precoding matrix indicator (PMI).

9. The operation method of claim 8, wherein the beam direction information of the base station is matched to one or more bits among all bits of the SSB index or one or more bits among all bits of the PMI.

10. The operation method of claim 1, wherein the channel estimation information is comprised in: a master information block (MIB), a system information block (SIB), a radio resource control (RRC) signal, a medium access control control element (MAC CE), or downlink control information (DCI).

11. The operation method of claim 1, wherein the performing of the channel estimation comprises performing the channel estimation based on: a compressive sensing technique, exhaustive search, or machine learning.

12. An operation method of a user equipment in a wireless communication system, the operation method comprising:
selecting a best synchronization signal block (SSB) from among a plurality of SSBs received from a base station;
obtaining beam direction information matched to the best SSB;
obtaining three-dimensional orientation information of the user equipment;
calculating a transmission/reception angle of the user equipment, based on the beam direction information and on the three-dimensional orientation information of the user equipment; and
forming a beam based on the transmission/reception angle of the user equipment.

13. The operation method of claim 12, wherein the beam direction information is generated using a geographic coordinate system.

14. The operation method of claim 12, wherein the selecting of the best SSB comprises selecting the best SSB based on: a received signal strength indicator (RSSI), reference signal received power (RSRP), or a reference signal-to-noise ratio.

15. The operation method of claim 12, wherein the obtaining of the beam direction information comprises obtaining the beam direction information matched to one or more bits among all bits of the best SSB.

16. The operation method of claim 12, further comprising:
obtaining location information of the base station; and
estimating a communication distance between the base station and the user equipment, based on the location information of the base station and location information of the user equipment,
wherein the forming of the beam comprises forming the beam based on a transmission/reception angle of the user equipment and the communication distance.

17. A user equipment for wireless communication, the user equipment comprising:
a plurality of element antennas; and
a communication processor configured to perform channel estimation for beamforming based on channel estimation information and form a beam based on the channel estimation,
wherein the channel estimation information comprises beam direction information of a base station, and
wherein the beam direction information is generated using a geographic coordinate system.

18. The user equipment of claim 17, further comprising a memory configured to receive and store location information of the base station,
wherein the channel estimation information further comprises the location information of the base station and location information of the user equipment.

19. The user equipment of claim 18, wherein the memory is configured to receive and store location information of a neighboring base station, and
the communication processor is further configured to, when performing hand-over, perform the channel estimation based on the location information of the neighboring base station.

20. The user equipment of claim 19, wherein the location information of the neighboring base station comprises: location information generated using the geographic coordinate system, or relative location information with respect to the location information of the base station.

* * * * *